(12) United States Patent
Eisenmann et al.

(10) Patent No.: US 6,437,695 B1
(45) Date of Patent: Aug. 20, 2002

(54) METHOD FOR CAPACITIVE OBJECT RECOGNITION IN VEHICLES

(75) Inventors: Lutz Eisenmann, Pascnbach; Robert Griessbach, Weyarn; Christian Marschner, Munich; Yan Lu, Freising, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/421,336

(22) Filed: Oct. 18, 1999

(30) Foreign Application Priority Data

Oct. 16, 1998 (DE) .......................................... 198 47 750

(51) Int. Cl.$^7$ ................................................ G08B 13/26
(52) U.S. Cl. ...................... 340/562; 340/605; 340/620; 340/635; 340/650; 340/870.37
(58) Field of Search ................................ 340/562, 605, 340/620, 635, 650, 870.37, 870.31, 870.32

(56) References Cited

U.S. PATENT DOCUMENTS

| | | | |
|---|---|---|---|
| 3,732,538 A | 5/1973 | Gillund et al. | |
| 3,751,674 A | 8/1973 | Holt | |
| 3,798,551 A | 3/1974 | Cake | |
| 4,796,013 A | * 1/1989 | Yasuda et al. | ............... 340/562 |
| 5,373,245 A | * 12/1994 | Vranish | ....................... 324/662 |
| 5,442,347 A | * 8/1995 | Vranish | ................. 340/870.37 |
| 5,446,391 A | * 8/1995 | Aoki et al. | .................. 340/562 |
| 5,525,843 A | 6/1996 | Höwing | |
| 6,043,743 A | * 3/2000 | Saito et al. | .................. 340/562 |

FOREIGN PATENT DOCUMENTS

| | | |
|---|---|---|
| DE | 36 35 644 A1 | 4/1986 |
| DE | 41 10 936 A1 | 10/1992 |
| WO | WO 97/29391 | 8/1997 |

\* cited by examiner

*Primary Examiner*—Jeffery Hofsass
*Assistant Examiner*—Daniel Previl
(74) *Attorney, Agent, or Firm*—Crowell & Moring LLP

(57) ABSTRACT

In a method for capacitive object recognition in vehicles, two capacitive electrodes are charged with alternating voltage and the presence of an object is detected by the change in the capacitance in the capacitor. The two electrodes are charged sequentially and individually with alternating voltages. The alternating currents that result in the leads of the two electrodes are analyzed jointly.

8 Claims, 2 Drawing Sheets

METHOD FOR CAPACITIVE OBJECT RECOGNITION IN VEHICLES

BACKGROUND AND SUMMARY OF THE INVENTION

This application claims the priority of German patent document 198 47 750.3, filed Oct. 16, 1998, the disclosure of which is expressly incorporated by reference herein.

The invention relates to a method and apparatus for capacitive object detection in a motor vehicle.

Capacitive object detection methods are known from various publications, such as U.S. Pat. No. 4,796,013. In principle, two electrodes (which as a rule are in the form of plates) are located adjacent to the object in question. To detect occupancy of a vehicle seat, for example, the electrodes can be located in the upholstery of a seat, e.g., in the seat cushion or seat back. In this case, occupancy recognition is used to trigger safety devices such as an airbag or the like only when the seat is actually occupied.

The capacitance of the capacitor thus formed is measured. When a person is present, the capacitance of the capacitor changes because of the relatively good conductivity of the human body. It is problematical in this situation however that known methods are based on the vehicle ground. Capacitance measurement is sharply distorted by leakage currents of a resistive or capacitive nature.

Practical tests have shown that the effect of the leakage currents far exceeds the effect of the change in capacitance as a rule. Another complicating factor is that the leakage currents depend to a large extent on ambient parameters such as humidity and on the individual being touched by another vehicle occupant. Thus there are two offsetting effects, and the effect of the leakage currents cannot be determined quantitatively. As a result, it is not possible to make any statement about the weight or the volume of the object on the seat (for example to recognize a child seat).

One way of solving these problems is provided in International patent document WO 95/21752, which corresponds to U.S. Pat. No. 5,525,843. In this patent, the two electrodes must be insulated from vehicle ground. However, complete insulation cannot be achieved because there is always at least capacitive coupling between the measuring arrangement containing the two electrodes and the vehicle ground, as well as through the object on the seat. Consequently, fault currents cannot be completely prevented. In addition, a potential-free design for such a measuring system is costly.

One object of the invention is to provide a method of the type described above, that achieves an accurate determination of the presence of an object, at low apparatus expense.

This and other objects and advantages are achieved by the capacitive object detection arrangement according to the invention, in which the two capacitive electrodes are operated successively with alternating voltage and the resultant alternating currents (a total of four in all) are analyzed. Each alternating current results from the alternate transmission and reception operation of the electrodes. From an overall consideration of the alternating currents it is possible to determine whether an object is present and how extensive the grounding of this object is. The latter is determined from the leakage currents which are not compensated but are considered individually.

It is useful to compare the two alternating currents that result from direct feedback (in other words the mutual influence of the two electrodes). These partial currents result when one electrode is in transmission operation and the other is in reception operation, or when transmission and reception are reversed. If the alternating currents are at least approximately the same size, the object is approximately correctly positioned. If the currents differ sharply from one another, as a rule an "out of position" situation exists, in other words the object does not conform in its position to the natural setting position.

Especially in the last case, the average of the two alternating currents can be used to calculate the grounding capacitance of the object. The result of the calculation is then sufficiently accurate.

Other objects, advantages and novel features of the present invention will become apparent from the following detailed description of the invention when considered in conjunction with the accompanying drawings.

DETAILED DESCRIPTION OF THE DRAWINGS

Figure 1:
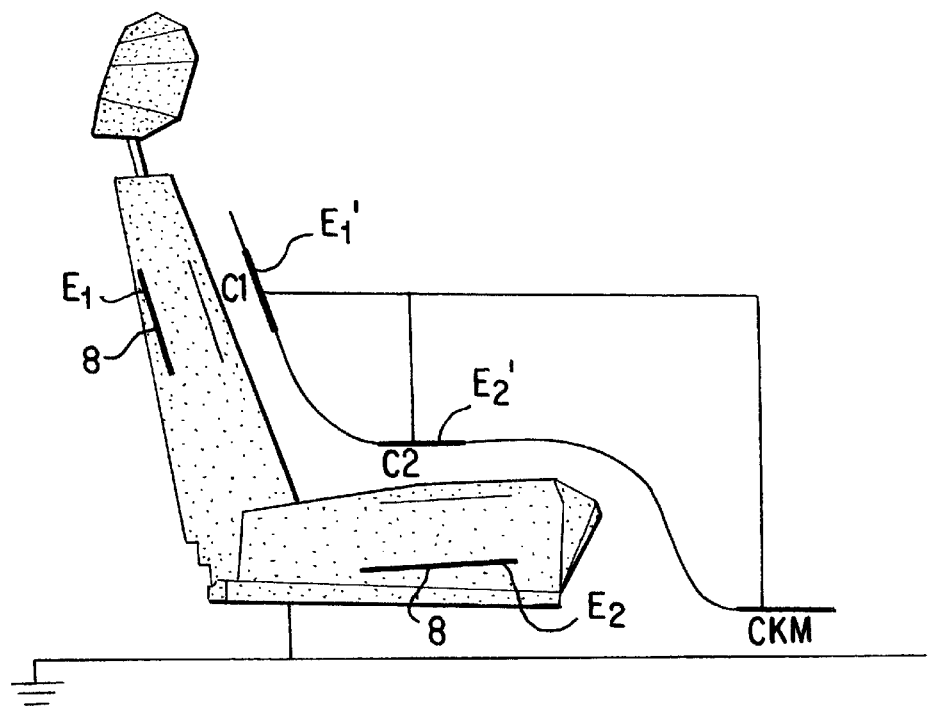
FIG. 1 shows a capacitive object detection arrangement according to the invention.

Referring to FIG. 1, electrodes E1 and E2 are located in a vehicle seat 1 (shown schematically), and each is charged with an alternating voltage. In practice, an alternating voltage frequency between 10 and 150 kHz (preferably 50 kHz) has proven advantageous. The alternating currents produced in leads 4 and 5 are determined using measuring devices 6,7. In the following, measured current amplitude I is of particular interest in each case.

There are theoretically two current measurement which can be made:

1. Measurement of the transmitting current (amplitude Î) at an electrode relative to ground with a known transmitting voltage and frequency ("loading mode"); and
2. Measurement of the receiving currents at the other electrode that is not transmitting ("coupled mode").

Figure 2:
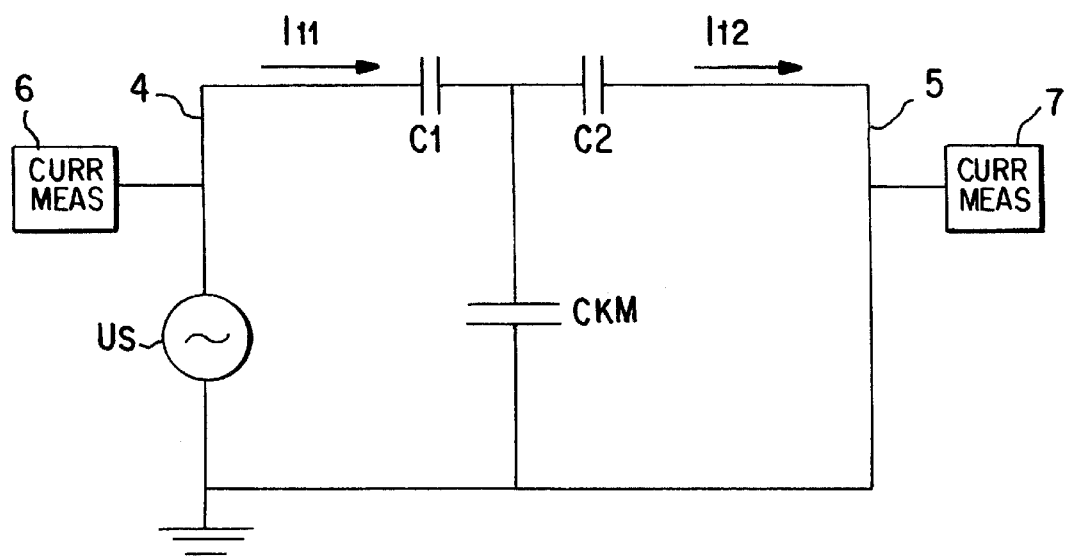
FIG. 2 shows an equivalent circuit diagram for a first operating mode of the method according to the invention.
Figure 3:
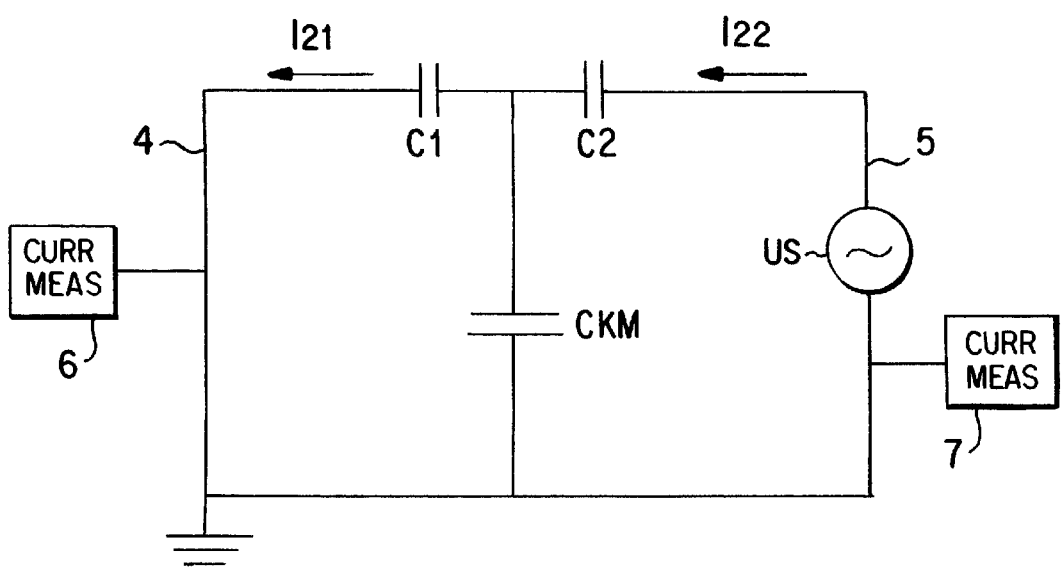
FIG. 3 is the equivalent circuit diagram for a second operating note of the method according to the invention.

A capacitative sensing system like that shown here generally suffers from the problem that the amplitudes are influenced by the grounding of the object. With a geometry such as that shown in FIG. 1, the effect of a stronger grounding of the object (occupant) is an increase in the measured current amplitude in the loading mode and a decrease in the measured current amplitude in the coupled mode. Grounding of the object is therefore achieved by a capacitor $C_{km}$, as shown in the equivalent circuit diagram (FIGS. 2 and 3). In FIGS. 2 and 3, the capacitor C1 is formed by the electrode E1 and the adjacent portion of the body of a seat occupant (shown as electrode E1') and the capacitor $C_2$ is formed by the electrode E2 together with the adjacent portion of the occupant's body (represented as electrode E2').

It is possible to determine the a prior unknown grounding of the object by a combination of the loading mode and the coupled mode measurements, and thus to eliminate the influence of ground. According to Kirchhoff's Law, the transmission operation of electrode E1 (and hence the reception operation of electrode E2) can be described by the equivalent circuit diagram in FIG. 2 and the transmission operation of electrode E2 (and hence the reception operation of electrode E1) is described by the equivalent circuit diagram shown in FIG. 3. Good coupling of the electrodes to the object and good shielding of the electrodes from ground are assumed. For this purpose, each partial electrode can have shielding in the form of electrically conducting plate 8 that produces a directional effect with respect to the object. (See U.S. Pat. No. 5,166,679 A, the disclosure of which is incorporated herein by reference.) For the case shown in FIG. 1, with two electrodes E1 and E2 in the seat, the following equations apply. The case of n electrodes results from the formation of any number of electrode pairs.

Assuming that one electrode is used ultimately for transmission and the other for reception, the four maximum current values (amplitudes) $\hat{I}_{ij}$ are calculated as follows:

$$I_{11} = C_1 \cdot \frac{C_2 + C_{KM}}{C_1 + C_2 + C_{KM}} \cdot \varpi U_S \text{ and } I_{22} = C_2 \cdot \frac{C_1 + C_{KM}}{C_1 + C_2 + C_{KM}} \cdot \varpi U_S$$

$$I_{12} = I_{21} = I_R = \frac{C_1 \cdot C_2}{C_1 + C_2 + C_{KM}} \cdot \varpi U_S$$

where $C_i$ is equal to the capacitance of electrode $E_i$ (i=1 or 2)

$U_S$ is equal to the alternating voltage amplitude,

ω is equal to the alternating voltage frequency and $I_{ii}$ is equal to the loading mode current of electrode $E_i$ or $I_{ij}$ is equal to the receiver current of electrode $E_j$ with $E_i$ as the transmitter.

The equation system with 3 equations and 3 unknowns can be solved with $S_{ii}=I_{ij}/(\omega U_S O)$ and $S_R=I_R/(\omega U_S)$; we have:

$$C_1 = \frac{S_{11} \cdot S_{22} - (S_R)^2}{S_{22} - S_R}$$

$$C_2 = \frac{S_{11} \cdot S_{22} - (S_R)^2}{S_{11} - S_R}$$

$$C_{KM} = \frac{S_{11} \cdot S_{22} - (S_R)^2}{S_R}$$

$C_1$ is a measure of the distance of the object from electrode E1, $C_2$ is a measure of the distance of the object from electrode E2, and $C_{KM}$ is the now known grounding of the object. Clear conclusions regarding the size, current position, and dimensions of an object can then be obtained. Safety devices not shown can thus be activated as necessary.

For the case in which the coupling of the object to electrodes E1 and/or E2 is not good, for example in out-of-position, receiver currents $\hat{I}_{12}$ and $\hat{I}_{21}$ are no longer the same. In this case it can be advantageous to use another value for $\hat{I}_R$, for example the smaller of the two values, and not the average of $\hat{I}_{12}$ and $\hat{I}_{21}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for object detection in a vehicle in which two electrodes forming respective first and second capacitances are energized with alternating voltage and presence of an object in proximity to the electrodes is determined by detecting changes in the first and second capacitances due to changes in capacitive coupling between the first and second electrodes and the object, comprising:

energizing the two electrodes, individually and time sequentially, with alternating voltages;

measuring respective alternating currents in said first and second capacitances when said first electrode is energized and then when said second electrode is energized; and analyzing measured currents to determine presence of an object in proximity to said electrodes.

2. A method according to claim 1, wherein alternating currents measured during energizing of said first electrode are compared with alternating currents measured during energizing of said second electrode.

3. A method according to claim 2, wherein average of the measured currents is analyzed.

4. A method according to claim 2, wherein the smaller of the measured currents is analyzed.

5. A method for capacitive object detection in a vehicle comprising:

providing first and second electrodes in proximity to a space within said vehicle in which an object is to be detected, whereby said first and second electrodes form first and second capacitances having capacitance values which vary with location of said object in said space;

time sequentially and separately energizing said first and second electrodes by applying thereto an a.c. voltage;

measuring respective electric currents flowing in said first and second capacitances when said first electrode is energized;

measuring respective electric currents flowing in said first and second capacitances when said second electrode is energized;

analyzing said measured currents to determine information concerning an object present in said space.

6. A method according to claim 5, wherein alternating currents measured during energizing of said first electrode are compared with alternating currents measured during energizing of said second electrode.

7. A method according to claim 6, wherein average of the measured currents is analyzed.

8. A method according to claim 6, wherein the smaller of the measured currents is analyzed.

* * * * *